US006975965B2

(12) United States Patent
Jager et al.

(10) Patent No.: US 6,975,965 B2
(45) Date of Patent: Dec. 13, 2005

(54) SYSTEM AND METHOD FOR HEURISTICALLY OPTIMIZING A LARGE SET OF AUTOMATED TEST SETS

(75) Inventors: Hayo Jager, Raleigh, NC (US); Theodore F. Rivera, Raleigh, NC (US); Adam Tate, Raleigh, NC (US); Scott A. Will, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 10/755,523

(22) Filed: Jan. 12, 2004

(65) Prior Publication Data

US 2005/0154559 A1    Jul. 14, 2005

(51) Int. Cl.$^7$ ............................................. G05B 13/02
(52) U.S. Cl. ....................................... 702/182; 700/32
(58) Field of Search ......................... 702/85, 103, 123, 702/182–186; 700/28, 32, 36, 100, 101, 103

(56) References Cited

U.S. PATENT DOCUMENTS

| | | | |
|---|---|---|---|
| 5,126,966 A | 6/1992 | Hafeman et al. | 703/16 |
| 5,206,582 A | 4/1993 | Ekstedt et al. | 324/73.1 |
| 5,359,546 A | 10/1994 | Hayes et al. | 702/123 |
| 5,390,325 A | 2/1995 | Miller | 714/38 |
| 5,513,315 A | 4/1996 | Tierney et al. | 714/37 |
| 5,557,740 A | 9/1996 | Johnson et al. | 714/38 |
| 5,634,098 A | 5/1997 | Janniro et al. | 714/38 |
| 5,751,941 A | 5/1998 | Hinds et al. | 714/38 |
| 5,754,446 A * | 5/1998 | Fisher et al. | 700/287 |
| 6,002,869 A | 12/1999 | Hinckley | 717/124 |
| 6,018,617 A | 1/2000 | Sweitzer et al. | 358/1.15 |
| 6,067,639 A | 5/2000 | Rodrigues et al. | 714/38 |
| 6,249,882 B1 | 6/2001 | Testardi | 714/38 |
| 6,530,039 B1 | 3/2003 | Yang | 714/38 |
| 6,556,952 B1 * | 4/2003 | Magro | 702/183 |
| 6,628,994 B1 * | 9/2003 | Turicchi et al. | 700/32 |
| 2002/0091746 A1 * | 7/2002 | Umberger et al. | 709/105 |

FOREIGN PATENT DOCUMENTS

| | | | |
|---|---|---|---|
| JP | 62-221741 | 9/1987 | G06F 11/22 |
| WO | WO 94/15289 | 7/1994 | G06F 11/00 |

OTHER PUBLICATIONS

Cabezas et al., "Personal Systems Functional Architectural Verification Methodology," IBM Technical Disclosure Bulletin, vol. 34, No. 10B, Mar. 1992, pp. 141–145.

* cited by examiner

*Primary Examiner*—Marc S. Hoff
*Assistant Examiner*—Manuel L. Barbee
(74) *Attorney, Agent, or Firm*—Van Leeuwen & Van Leeuwen; Gerald R. Woods (57) ABSTRACT

A system and method for heuristically optimizing a large set of automated test sets is presented. An automation control engine is used as a front end to a system automation engine. The automation control engine provides a set of input parameters, such as a buffer size and queue size, to the system automation engine. The system automation engine uses the input parameters along with a set of test sequences, to test a system under test. The system automation engine receives output variables from the system under test based upon the test, and sends the output variables to automation control engine. The automation control engine adjusts the input parameter values until the output variables meet one or more performance goals.

16 Claims, 6 Drawing Sheets

SYSTEM AND METHOD FOR HEURISTICALLY OPTIMIZING A LARGE SET OF AUTOMATED TEST SETS

BACKGROUND OF THE INVENTION

1. Technical Field

The present invention relates in general to a system and method for heuristically optimizing a large set of automated test sets. More particularly, the present invention relates to a system and method for heuristically adjusting input parameters based upon output variables in order to meet one or more performance goals.

2. Description of the Related Art

An automated test system usually includes two primary components which are a system under test and a system automation engine. A set of input parameters and scripts drives the system automation engine which, in turn, drives the system under test. A typical system automation engine establishes environmental conditions, such as particular load environments, and tests the system under test using a set of input parameters. While testing, the system automation engine collects a set of data (i.e. output variables) from the system under test. After testing, the system automation engine may analyze the data to identify trends or parameters that exceed preset limits.

A user may wish to implement performance testing in order to identify how to optimize his computer system when the computer system is executing a particular application. During performance testing, a system automation engine uses a set of software modules with a large number of test sequences to characterize a system under test. Each test sequence has a unique set of input parameters and a specified data load. Given the complexity of many computer systems, a challenge found is that a numerous amount of test sequence executions are required in order to adequately characterize a system under test. In addition, another challenge found is in analyzing and interpreting the vast amount of resulting test data. Quite frequently, it becomes unfeasible to execute a complete sequence of tests. Therefore, a system automation engine typically uses a subset of input parameters and data loads to test a system under test that represents boundary conditions. However, a challenge found is that this approach may not capture a computer system's optimum performance.

What is needed, therefore, is a system and method to automatically identify input parameter values that results in a system under test's optimum performance.

SUMMARY

It has been discovered that the aforementioned challenges are resolved by using an automation control engine to provide adjusted input parameter values to a system automation engine whereby the input parameter values are adjusted based upon output variable results received from the system automation engine. The automation control engine compares the output variables with one or more performance goals, and adjusts the input parameters until the output variables meet the performance goals.

A user wishes to optimize his system while executing a particular application. For example, the user may be managing a web service whereby the user wishes to configure his system such that the web service can receive a maximum amount of users and, at the same time, minimize the amount of time that each user has to wait for a response. The application is configured as a system under test and the user uses a system automation engine in conjunction with the automation control engine to identify input parameter settings, such as a buffer size, which optimizes his system.

The user sends a request to an automation control engine which acts as a front end to a system automation engine and is responsible for adjusting input parameters such that the system under test's output variables meet particular performance goals. Upon receiving the request, the automation control engine retrieves baseline input parameters from a data storage area. For example, the automation control engine may have four input parameters in which to optimize, and the automation control engine retrieves a "starting" value for each input parameter. The automation control engine sends the baseline input parameters to the system automation engine. The system automation engine uses the baseline input parameters as inputs to a plurality of test sequences. The test sequences are a set of tests which test particular characteristics of the system under test. The system automation engine tests the system under test using the test sequences, and, in return, receives output variables from the system under test.

The system automation engine provides the output variables to the automation control engine, which determines whether to increment or decrement a particular input parameter based upon comparing the output variables with particular performance goals. For example, an automation control engine's input parameters may be a buffer size, a queue size, a background CPU utilization, and a task priority. In this example, the automation control engine may adjust the buffer size while keeping the other three input parameters constant in order to determine an optimum buffer size corresponding to the system under test.

The automation control engine increments or decrements the input parameter, and resends the adjusted input parameter to the system automation engine to use with the test sequences. The automation control engine continues to adjust a particular input parameter until the adjustment does not result in a performance improvement. At this point, the automation control engine stores the optimized input parameter value in a storage area, and the automation control engine selects a second input parameter to optimize.

Once the automation control engine has optimized each parameter, the automation control engine sends the optimized input parameter values to the user. Using the example described above, processing sends optimized values for the buffer size, the queue size, the background CPU utilization, and the task priority to the user. The user may then configure his system using the optimized input parameters in order to optimize his system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
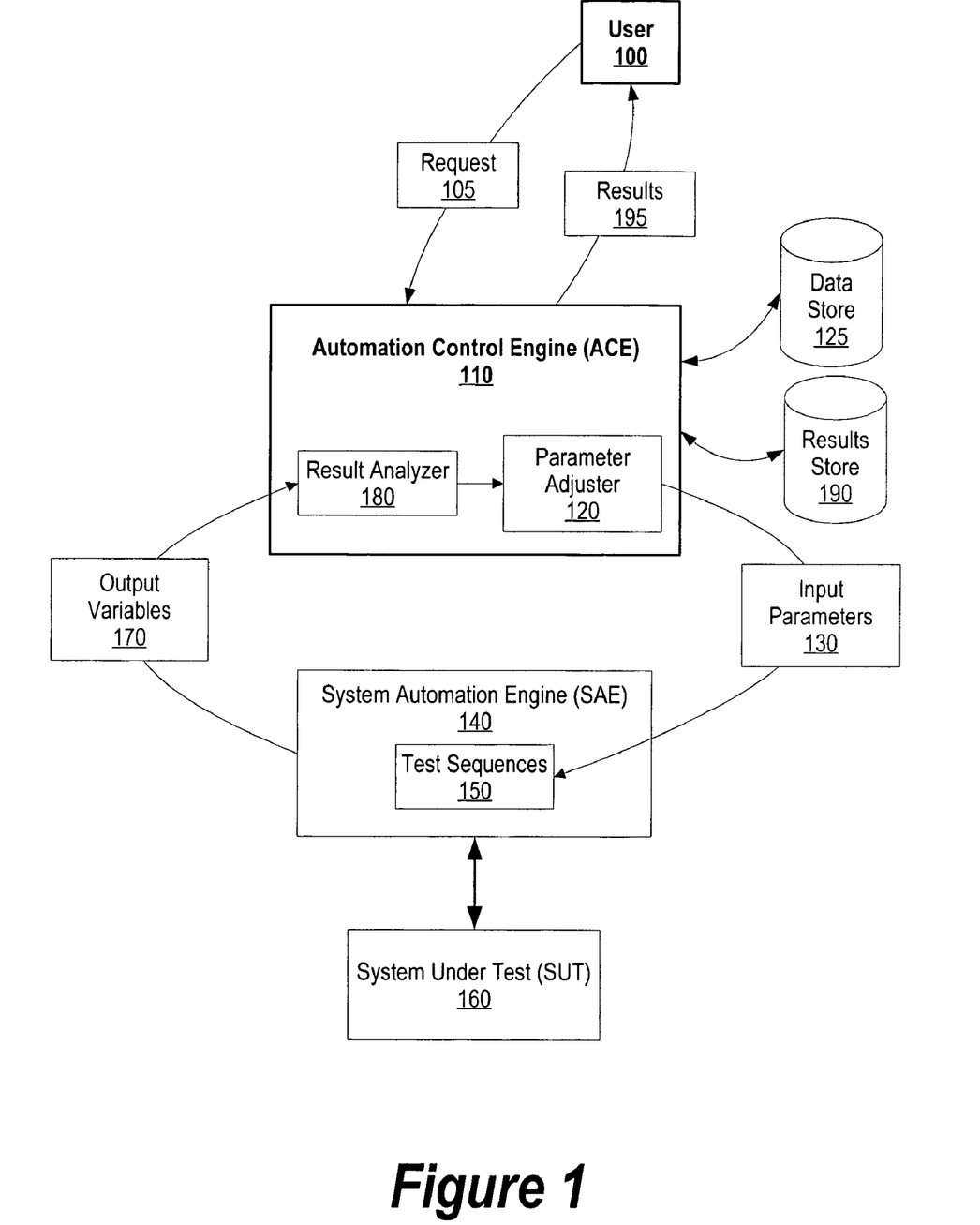
FIG. 1 is a diagram showing an automation control engine optimizing input parameters for a system automation engine in order to meet particular performance goals.

FIG. 1 is a diagram showing an automation control engine optimizing input parameters for a system automation engine in order to meet particular performance goals. User 100 wishes to optimize his system while executing system under test (SUT) 160. For example, user 100 may be managing a web service whereby the user wishes to configure his system such that the web service can receive a maximum amount of users and, at the same time, minimize the amount of time that each user has to wait for a response.

User 100 sends request 105 to automation control engine (ACE) 110. Automation control engine 110 acts as a front end to system automation engine 140 and is responsible for adjusting input parameters (e.g. input parameters 130) such that system under test 160's output variables (e.g. output variables 170) meet particular performance goals.

Upon receiving request 105, parameter adjuster 120 retrieves baseline input parameters from data store 125. For example, automation control engine 110 may have four input parameters in which to optimize, and automation control engine 110 retrieves a "starting" value for each input parameter. Data store 125 may be stored on a nonvolatile storage area, such as a computer hard drive. Parameter adjuster 120 sends the baseline input parameters (e.g. input parameters 130) to system automation engine 140. System automation engine 140 uses the baseline input parameters as inputs to test sequences 150. Test sequences 150 are a set of tests which test particular characteristics of system under test 160. System automation engine 140 tests system under test 160 using test sequences 150, and receives output variables from system under test 160. System automation engine 140 provides output variables to automation control engine 110, which uses result analyzer 180 to identify whether system under test 160's output variables meet particular performance goals.

Result analyzer 180 informs parameter adjuster 120 whether to increment or decrement a particular input parameter based upon comparing output variables 170 with particular performance goals. For example, four input parameters may be a buffer size, a queue size, a background CPU utilization, and a task priority. In this example, automation control engine 110 may adjust the buffer size while keeping the other three input parameters constant in order to determine an optimum buffer size corresponding to system under test 160. Parameter adjuster 120 increments or decrements the input parameter, and resends the adjusted input parameter to system automation engine 140 to use with test sequences 150. Result analyzer 180 and parameter adjuster 120 continue to adjust a particular input parameter until the adjustment does not result in a performance improvement. At this point, result analyzer 180 stores the input parameter value in results store 190, and parameter adjuster 120 selects a second input parameter to optimize (see FIGS. 4, 5, and corresponding text for further details regarding input parameter optimization). Once automation control engine 110 has optimized each parameter, automation control engine 110 sends results 195 to user 100 which include the optimized values of each input parameter. Using the example described above, processing sends optimized values for the buffer size, the queue size, the background CPU utilization, and the task priority to user 100. User 100 may then configure his system using the optimized input parameters in order to optimize his system when the system is executing system under test 160.

In one embodiment, the above invention is implemented on several networked computer systems. For example, user 100 may be on a first computer system, automation control engine 110 and system automation engine 140 may be on a second computer system, and system under test 160 may be on a third computer system.

Figure 2:
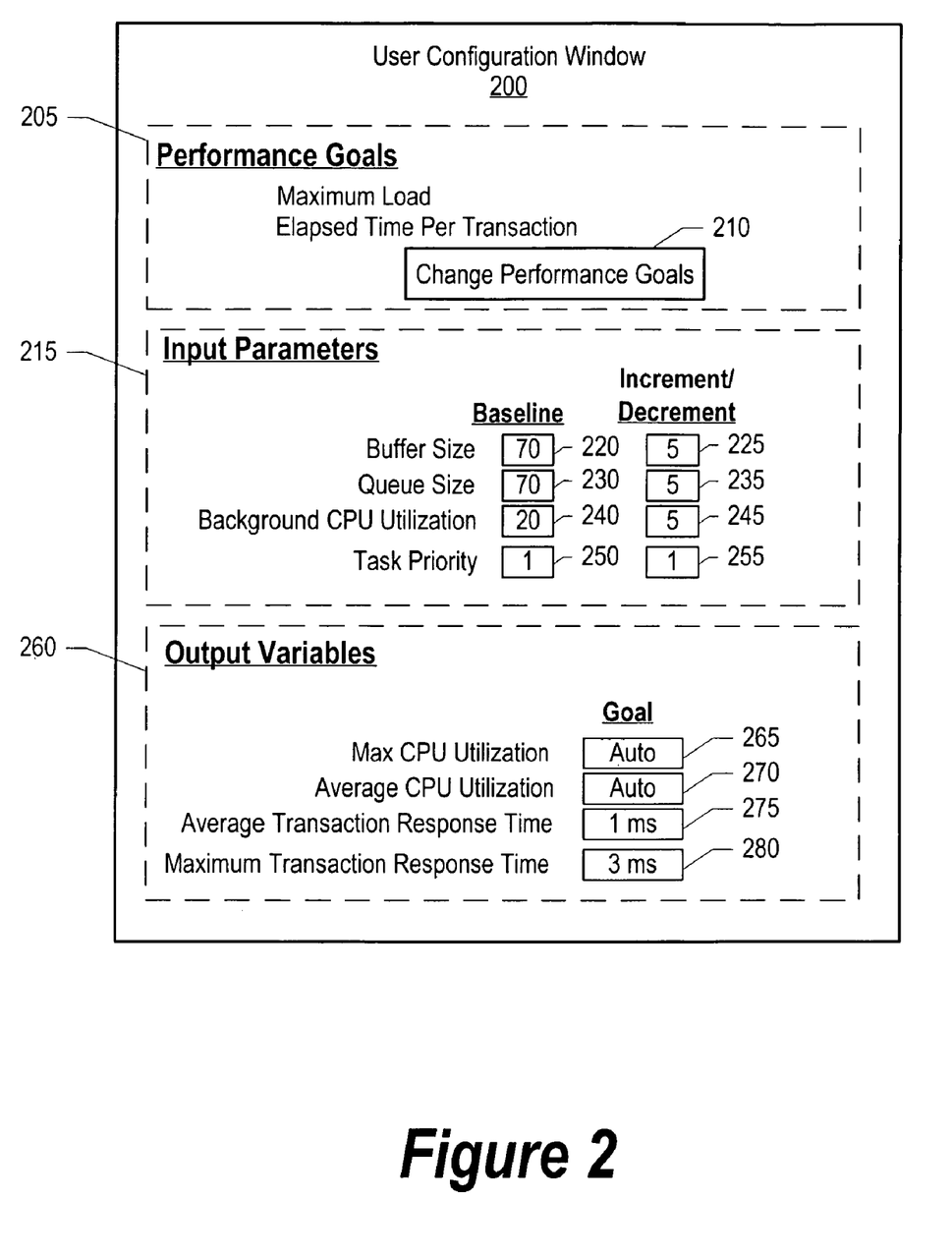
FIG. 2 is a user interface window showing various user settings for a test scenario.

FIG. 2 is a user interface window showing various user settings for a test scenario. Window 200 includes three main sections which are performance goals 205, input parameters 215, and output variables 260. Performance goals 205 includes a list of performance goals and command button 210 which a user may select in order to change the performance goals. Window 200 shows that a user's performance goals are to achieve maximum load with a minimum elapsed time per transaction. For example, a user may be managing a web service whereby the user wishes to configure his system such that the web service can receive a maximum amount of users and, at the same time, minimize the amount of time that each user has to wait for a response.

Input parameters 215 include a list of input parameters as well as a baseline value and adjustment value for each input parameter. In one embodiment, input parameters 215 include a range, such as a minimum and maximum, for each input parameter. Text boxes 220, 230, 240, and 250 include baseline input parameter values for a buffer size, a queue size, a background CPU utilization, and a task priority, respectively. If a user wishes to change an input parameter's baseline value, the user enters a new value in the appropriate text box. Text boxes 225, 235, 245, and 255 include increment/decrement values for the buffer size, the queue size, the background CPU utilization, and the task priority, respectively. If a user wishes to change the increment/decrement amount of a particular parameter, the user enters a new increment/decrement value in the appropriate text box.

Output variables 260 include a list of output variables and their respective goals which are shown in text boxes 265 through 280. Text box 265 shows that a user wishes an automation control engine to automatically optimize a system's maximum CPU utilization. In addition, text box 270 shows that a user wishes an automation control engine to automatically optimize a system's average CPU utilization. Text box 275 shows that a user wishes the automation control engine to adjust input parameter values until the average transaction response time is one millisecond. Likewise, text box 280 shows that a user wishes the automation control engine to adjust input parameter values until the maximum transaction response time is three milliseconds.

Figure 3:
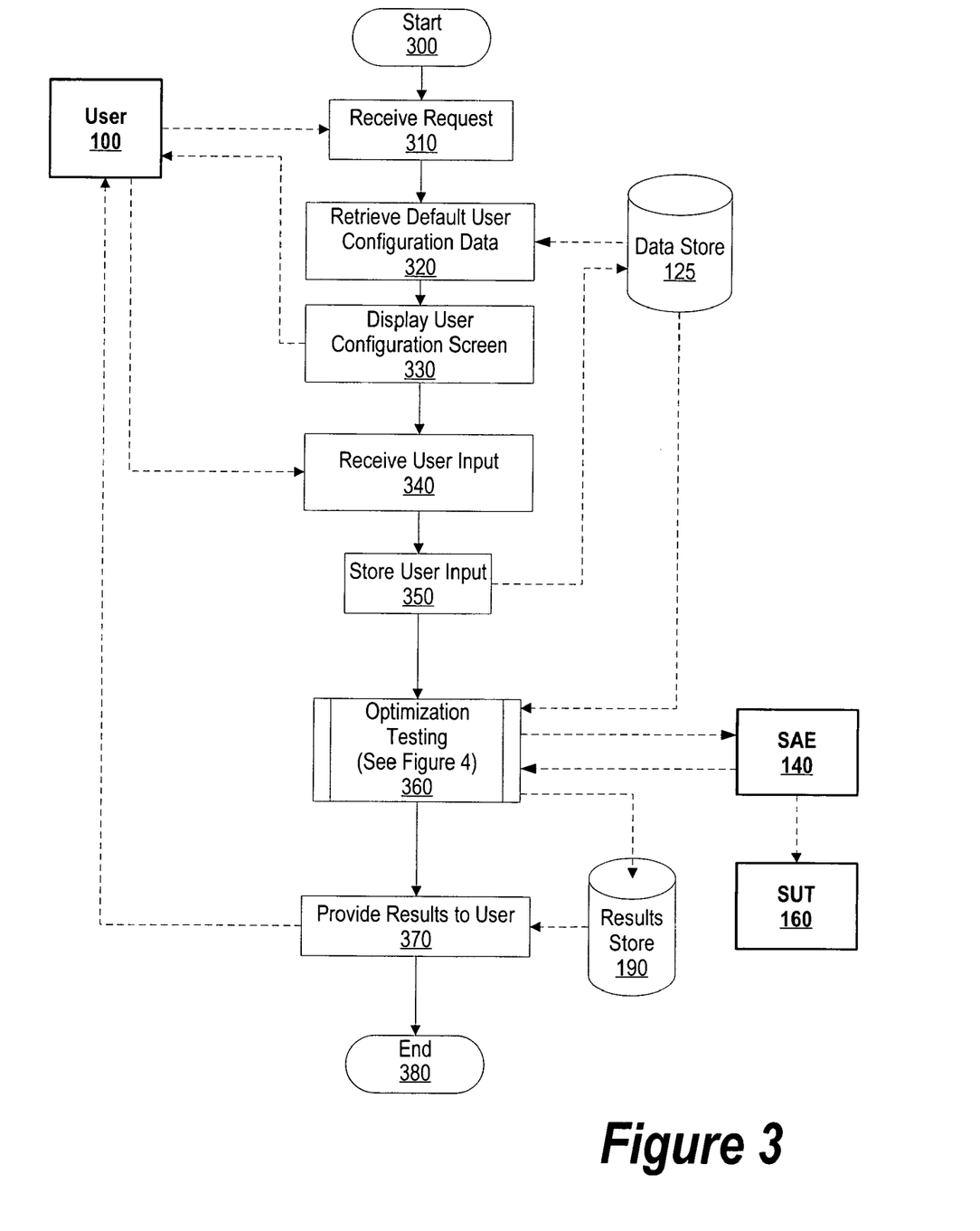
FIG. 3 is a high level flowchart showing steps taken in receiving a user request and optimizing a system by adjusting one or more input parameters.

FIG. 3 is a high level flowchart showing steps taken in receiving a user request and optimizing a system by adjusting one or more input parameters. Automation control engine processing commences at 300, whereupon processing receives a request from user 100 at step 310. The request includes performance goals and a request for the automation control engine to optimize input parameters in order to meet the requested performance goals. User 100 is the same as that shown in FIG. 1.

Processing retrieves default user configuration data from data store 125 at step 320, and displays the default user configuration data to user 100 in a user interface window (step 330). Default user configuration data includes baseline input parameter values in which the automation control engine uses as a starting point for adjusting input parameters (see FIG. 2 and corresponding text for further details regarding default user configuration data). Data store 125 is the same as that shown in FIG. 1.

Automation control engine processing receives user input from user 100 at step 340, and stores the user input in data store 125 at step 350. The user input may be a performance specification or user 100 may request the automation control engine to optimize his system based upon the default user configuration data. Processing uses the user input to provide input parameters to system automation engine 140. In turn, system automation engine 140 uses the input parameters, along with test patterns, to test system under test 160. When system automation engine 140 is finished testing system under test 160, system automation engine 140 returns output variables to the automation control engine. In turn, the automation control engine adjusts the input parameters until they are optimized, and stores the optimized input parameter results in results store 190 (pre-defined process block 360, see FIG. 4 and corresponding text for further details). System automation engine 140, system under test 160, and results store 190 are the same as that shown in FIG. 1.

Once automation control engine processing is finished optimizing each input parameter, automation control engine processing provides the optimized input parameters to user 100 at step 370, and processing ends at 380. In one embodiment, user 100 may update his user input (i.e. performance specification) whereby automation control engine processing identifies whether it should restart optimization testing, or whether to adjust particular input parameters and continue optimization testing without restarting.

Figure 4:
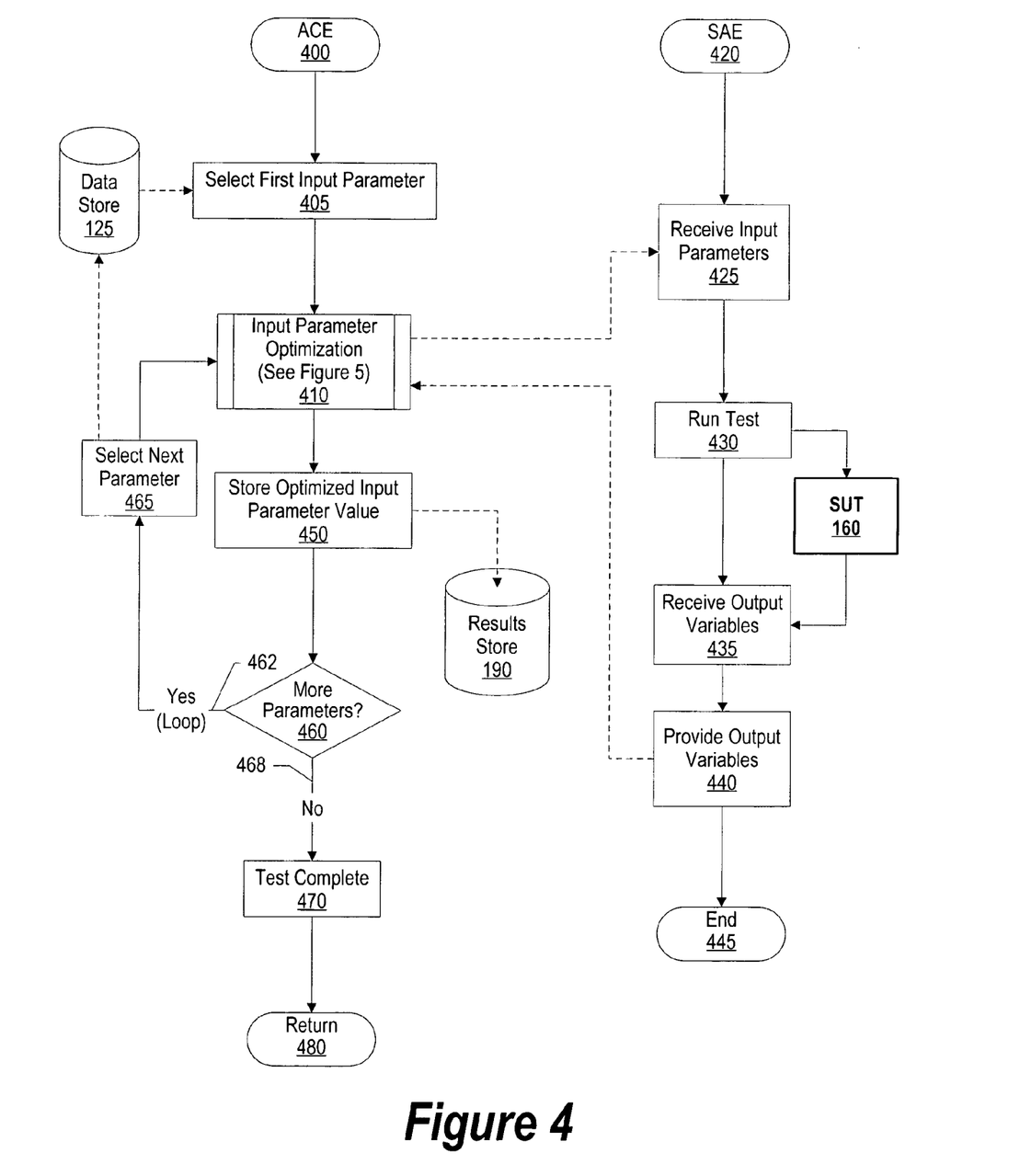
FIG. 4 is a flowchart showing steps taken in sequencing through and optimizing each input parameter.

FIG. 4 is a flowchart showing steps taken in sequencing through and optimizing each input parameter. Automation control engine processing commences at 400, whereupon processing selects a first input parameter from data store 125. For example, an automation control engine may have four input parameters to optimize and the automation control engine selects one of the four input parameters to adjust while keeping the other three input parameters constant. Automation control engine processing provides input parameters, one which is adjusted and others that are not, to a system automation engine. The automation control engine receives feedback (e.g. output variables) from the system automation engine and continues to tweak the selected input parameter until the output variables stop improving (pre-defined process block 410, see FIG. 5 and corresponding text for further details).

System automation engine processing commences at 420, whereupon processing receives input parameters from the automation control engine at step 425. The system automation engine runs a test on system under test 160 using the input parameters and test patterns (step 430). System under test 160 is the same as that shown in FIG. 1. System automation engine processing receives output variables from system under test 160 that correspond to the test (step 435), and the system automation engine provides the output variables to the automation control engine at step 440. System automation engine processing ends at 445 and re-commences when it receives more input parameters from the automation control engine.

Once automation control engine processing has optimized one of the input parameters, the automation control engine stores the optimized input parameter value in results store 190 at step 450. Results store 190 is the same as that shown in FIG. 1. A determination is made as to whether the automation control engine has more input parameters to optimize (decision 460). For example, the automation control engine may have four input parameters to optimize and has completed optimizing the first of the four input parameters. If the automation control engine has more input parameters to optimize, decision 460 branches to "Yes" branch 462 which loops back to select (step 465) and optimize the next input parameter. This looping continues until there are no more input parameters to optimize, at which point decision 460 branches to "No" branch 468 whereupon the automation control engine acknowledges that testing is complete (step 470), and processing returns at 480.

Figure 5:
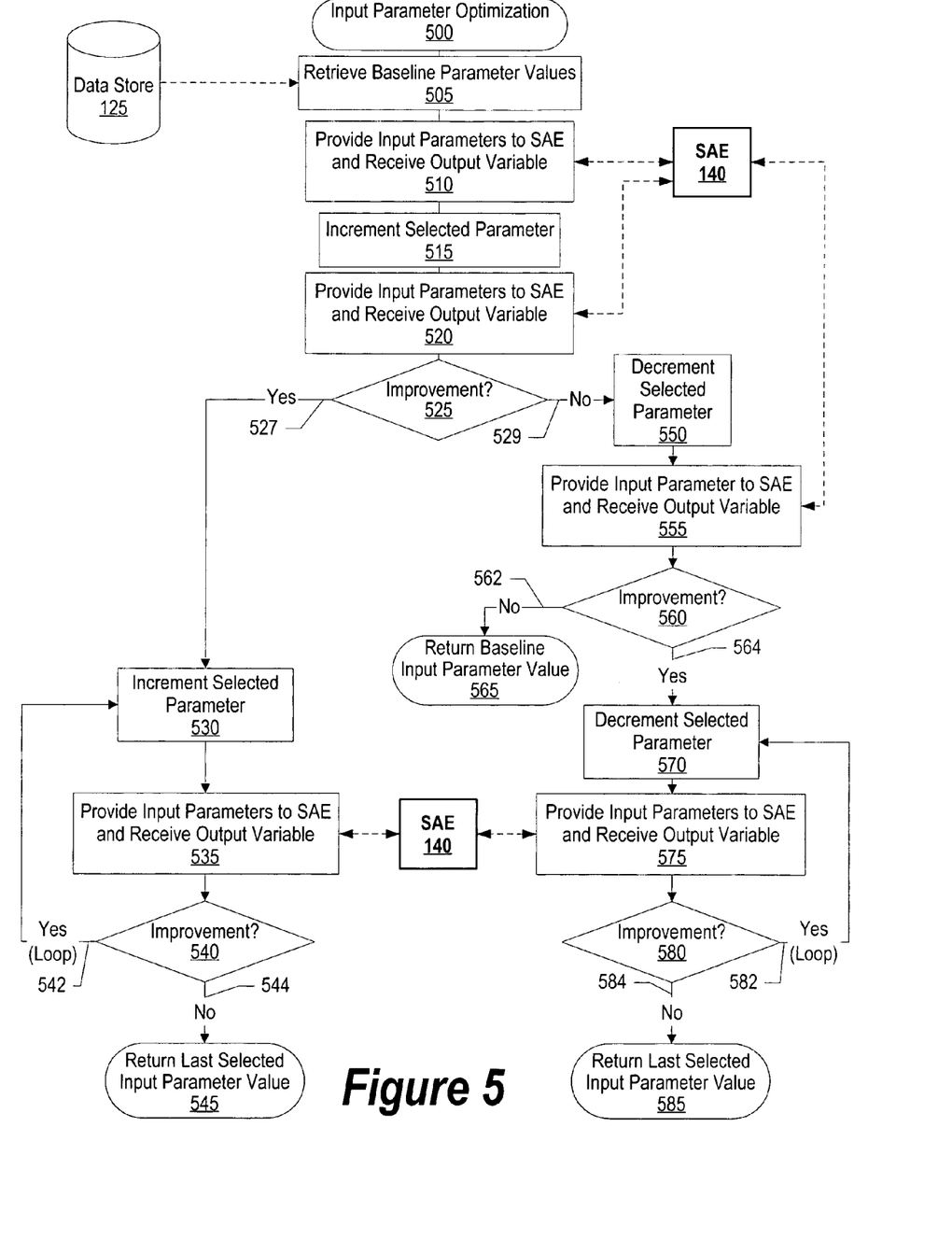
FIG. 5 is a flowchart showing steps taken in optimizing a selected input parameter based upon the values of one or more output variables.

FIG. 5 is a flowchart showing steps taken in optimizing a selected input parameter based upon the values of one or more output variables. Input parameter optimization processing commences at 500, whereupon processing retrieves baseline (i.e. initial) parameter values from data store 125. For example, if an automation control engine wishes to optimize four input parameters, the automation control engine retrieves four baseline values that correspond to each of the four input parameters.

Processing provides the input parameters to system automation engine 140 whereby system automation engine 140 returns a first set of output variables which it collected from a system under test (step 510). Processing increments a selected input parameter value at step 515. For example, if processing is optimizing four input parameters, processing increments the first parameter while keeping the other input parameters constant (see FIG. 4 and corresponding text for further details regarding input parameter selection). Processing provides the incremented parameter, as well as unchanged input parameters, to system automation engine 140, whereby system automation engine 140 returns a second set of output variables (step 520).

A determination is made as to whether the second set of output variables is closer than the first set of output variables to one or more performance goals (decision 525). For example, if a user's performance goal is to minimize an elapsed time per transaction, processing compares an average transaction response time output variable it receives with the first set of output variables with a value it receives with the second set of output variables. In this example, if the average transaction response time output variable is lower in the second set of output variables, then processing determines that the output variables are getting closer to the performance goals by incrementing the selected input parameter.

If processing determines that there is an improvement towards meeting a performance goal, decision 525 branches to "Yes" branch 527 whereupon processing increments, once again, the selected parameter at step 530. Processing provides the incremented parameter, as well as the unchanged input parameters, to system automation engine 140, whereby system automation engine 140 returns a third set of output variables (step 535). A determination is made as to whether the third set of output variables is closer than the second set of output variables to one or more performance goals (decision 540). If the third set of output variables is closer than the second set of output variables to one or more performance goals, decision 540 branches to "Yes" branch 542 which loops back to increment the selected parameter. This looping continues until processing does not detect an improvement in output variables by incrementing the selected input parameter, at which point decision 540 branches to "No" branch 544 whereupon processing returns the last input parameter value that improved the output variables at 545.

If, after initially incrementing the selected input parameters, the second set of output variables is not closer than the first set of output variables to one or more performance goals, decision 525 branches to "No" branch 529 indicating that incrementing the selected input parameter did not help in reaching the performance goal. Therefore, processing decrements the selected parameter (step 550) and provides the decremented parameter, as well as the unchanged input parameters, to system automation engine 140, whereby system automation engine 140 returns a third set of output variables (step 555).

A determination is made as to whether the third set of output variables is closer than the second set of output variables to one or more performance goals (decision 560). If the third set of output variables is not closer than the second set of output variables to one or more performance goals, then the selected input parameter's baseline value is used and decision 560 branches to "Yes" branch 562 whereupon processing returns the selected input parameter's baseline value at 565. On the other hand, if the third set of output variables is closer than the second set of output variables to one or more performance goals, then decision 560 branches to "Yes" branch 564 whereupon the selected input parameter is decremented once again at step 570.

Processing provides the decremented parameter, as well as the unchanged input parameters, to system automation engine 140, whereby system automation engine 140 returns a fourth set of output variables (step 575). A determination is made as to whether the fourth set of output variables is closer than the third set of output variables to one or more performance goals (decision 580). If the fourth set of output variables is closer than the third set of output variables to one or more performance goals, decision 580 branches to "Yes" branch 582 which loops back to decrement the selected parameter. This looping continues until processing does not detect an improvement in output variables by decrementing the selected input parameter, at which point decision 580 branches to "No" branch 584 whereupon processing returns the last input parameter value that improved the output variables at 585.

Figure 6:
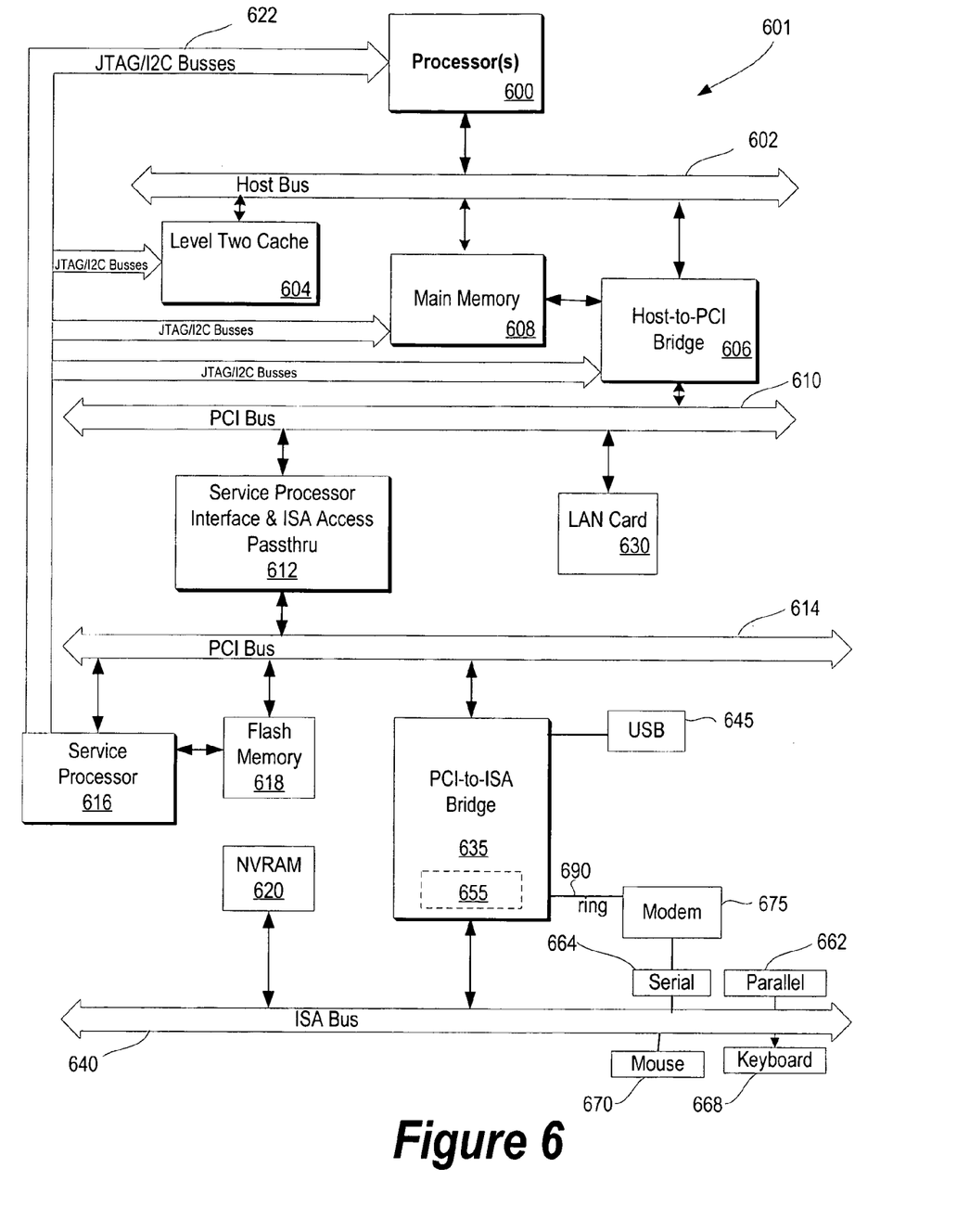
FIG. 6 is a block diagram of an information handling system capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions. PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method comprising:
receiving one or more performance goals;
retrieving a first input parameter value from a plurality of input parameter values, the plurality of input parameter values corresponding to one or more of the performance goals;
providing the first input parameter value to a test system;
receiving one or more first output variables from the test system corresponding to the first input parameter value;
adjusting the first input parameter value;
providing the adjusted first input parameter value to the test system;
receiving one or more second output variables from the test system corresponding to the adjusted first input parameter value;
determining whether the second output variables are closer than the first output variables to one or more of the performance goals;
optimizing the adjusted first input parameter value based upon the determination;
retrieving a second input parameter value from the plurality of input parameter values;
providing the second input parameter value and the optimized first input parameter value to the test system;
receiving one or more third output variables from the test system corresponding to the second input parameter value and the optimized first input parameter; and
adjusting the second input parameter value based upon the received third output variables in order to meet one or more of the performance goals.

2. The method of claim 1 wherein the test system is a system automation engine and wherein the system automation engine is adapted to test a system under test using the first input parameter value and receive the first output variables from the system under test.

3. The method of claim 1 wherein the adjusting is selected from the group consisting of incrementing the first input parameter value and decrementing the first input parameter value.

4. The method of claim 1 wherein the first input parameter is selected from the group consisting of a buffer size, a queue size, a background CPU utilization, and a task priority.

5. The method of claim 1 wherein at least one of the first output variables are selected from the group consisting of a maximum CPU utilization, an average CPU utilization, an average translation response time, and a maximum timer response time.

6. An information handling system comprising:
one or more processors;
a memory accessible by the processors;
one or more nonvolatile storage devices accessible by the processors; and
an input parameter optimization tool for optimizing one or more input parameters, the input parameter optimization tool comprising software code effective to:
receive one or more performance goals over a computer network;
retrieve a first input parameter value from a plurality of input parameter values located in one of the nonvolatile storage devices, the plurality of input parameter values corresponding to one or more of the performance goals;
provide the first input parameter value to a test system;
receive one or more first output variables from the test system corresponding to the first input parameter value;
adjust the first input parameter value;
provide the adjusted first input parameter value to the test system;
receive one or more second output variables from the test system corresponding to the adjusted first input parameter value;
determine whether the second output variables are closer than the first output variables to one or more of the performance goals;
optimize the adjusted first input parameter value based upon the determination;
retrieve a second input parameter value from the plurality of input parameter values located in one of the nonvolatile storage devices;
provide the second input parameter value and the optimized first input parameter value to the test system;
receive one or more third output variables from the test system corresponding to the second input parameter value and the optimized first input parameter; and
adjust the second input parameter value based upon the received third output, variables in order to meet one or more of the performance goals.

7. The information handling system of claim 6 wherein the test system is a system automation engine and wherein the system automation engine is adapted to test a system under test using the first input parameter value and receive the first output variables from the system under test.

8. The information handling system of claim 6 wherein the adjusting is selected from the group consisting of incrementing the first input parameter value and decrementing the first input parameter value.

9. The information handling system of claim 6 wherein the first input parameter is selected from the group consisting of a buffer size, a queue size, a background CPU utilization, and a task priority.

10. A computer program product stored on a computer operable media for optimizing at least one of a plurality of input parameter values, said computer program product comprising software code effective to:
receive one or more performance goals;
retrieve a first input parameter value from the plurality of input parameter values, the plurality of input parameter values corresponding to one or more of the performance goals;
provide the first input parameter value to a test system;
receive one or more first output variables from the test system corresponding to the first input parameter value;
adjust the first input parameter value;

provide the adjusted first input parameter value to the test system;

receive one or more second output variables from the test system corresponding to the adjusted first input parameter value;

determine whether the second output variables are closer than the first output variables to one or more of the performance goals;

optimize the adjusted first input parameter value based upon the determination;

retrieve a second input parameter value from the plurality of input parameter values;

provide the second input parameter value and the optimized first input parameter value to the test system;

receive one or more third output variables from the test system corresponding to the second input parameter value and the optimized first input parameter; and adjust the second input parameter value based upon the received third output variables in order to meet one or more of the performance goals.

11. The computer program product of claim 10 wherein the test system is a system automation engine and wherein the system automation engine is adapted to test a system under test using the first input parameter value and receive the first output variables from the system under test.

12. The computer program product of claim 10 wherein the adjusting is selected from the group consisting of incrementing the first input parameter value and decrementing the first input parameter value.

13. The computer program product of claim 10 wherein the first input parameter is selected from the group consisting of a buffer size, a queue size, a background CPU utilization, and a task priority.

14. The computer program product of claim 10 wherein at least one of the first output variables are selected from the group consisting of a maximum CPU utilization, an average CPU utilization, an average translation response time, and a maximum timer response time.

15. A computer implemented method comprising:

receiving one or more performance goals;

retrieving a first input parameter value from a plurality of input parameter values, the plurality of input parameter values corresponding to one or more of the performance goals;

providing the first input parameter value to a test system, wherein the test system is a system automation engine and wherein the system automation engine is adapted to test a system under test using the first input parameter value and receive one or more first output variables from the system under test;

receiving one or more of the first output variables from the test system corresponding to the first input parameter value;

adjusting the first input parameter value based upon the received first output variables in order to meet one or more of the performance goals;

providing the adjusted first input parameter value to the test system;

receiving one or more second output variables from the test system corresponding to the adjusted first input parameter value;

determining whether the second output variables are closer than the first output variables to one or more of the performance goals; and performing the adjusting again based upon the determination.

16. A computer program product stored on a computer operable media for optimizing at least one of a plurality of input parameter values, said computer program product comprising software code effective to:

receive one or more performance goals;

retrieve a first input parameter value from a plurality of input parameter values, the plurality of input parameter values corresponding to one or more of the performance goals;

provide the first input parameter value to a test system, wherein the test system is a system automation engine and wherein the system automation engine is adapted to test a system under test using the first input parameter value and receive one or more first output variables from the system under test;

receive one or more of the first output variables from the test system corresponding to the first input parameter value;

adjust the first input parameter value based upon the received first output variables in order to meet one or more of the performance goals;

provide the adjusted first input parameter value to the test system;

receive one or more second output variables from the test system corresponding to the adjusted first input parameter value;

determine whether the second output variables are closer than the first output variables to one or more of the performance goals; and perform the adjusting again based upon the determination.

* * * * *